Nov. 8, 1938.  J. H. WOODALL  2,135,955
BASKET CUSHION
Filed Oct. 4, 1935
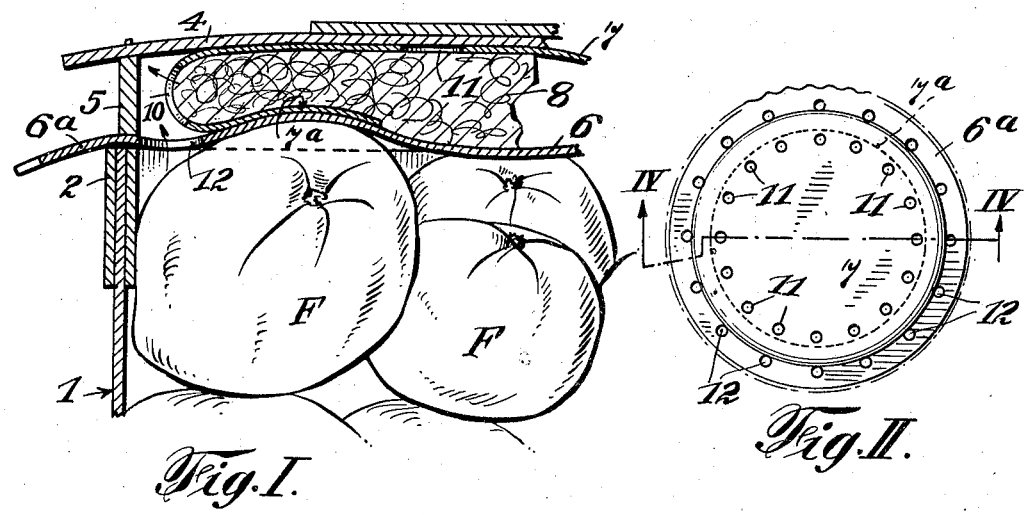
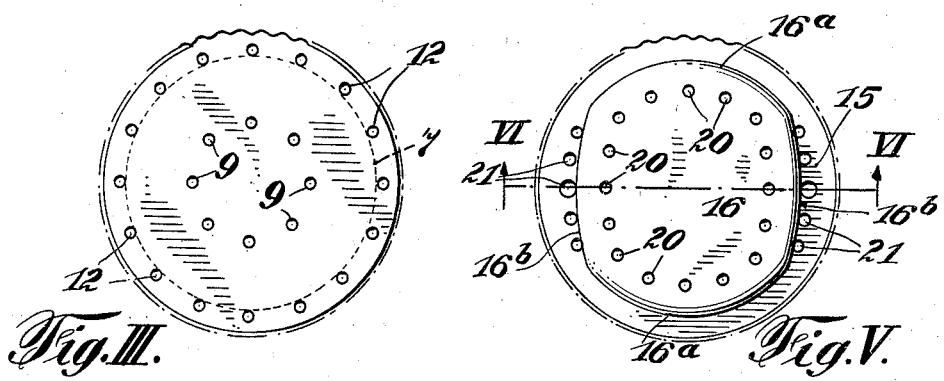
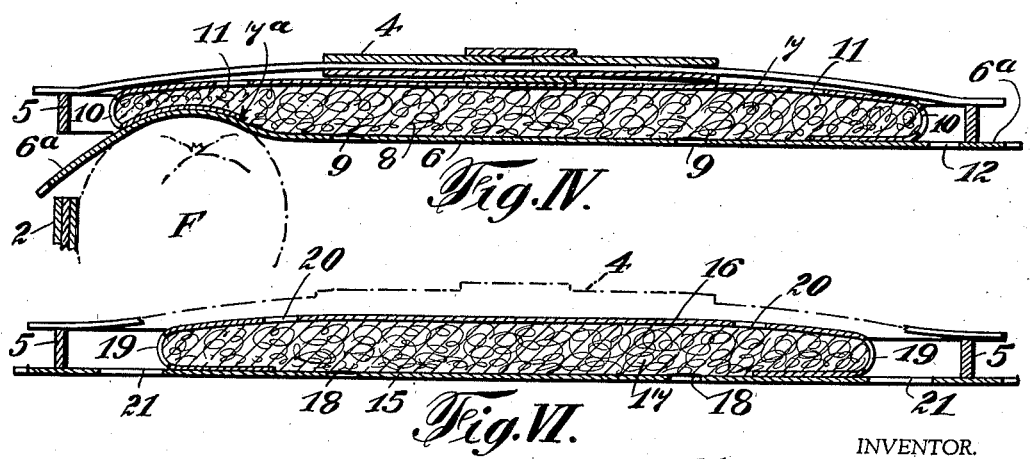
INVENTOR.
John H. Woodall
BY Ramsey, Kent, Chisholm & Lutz
his ATTORNEYS Patented Nov. 8, 1938

2,135,955

UNITED STATES PATENT OFFICE 2,135,955

BASKET CUSHION

John H. Woodall, Woodland, Ga.

Application October 4, 1935, Serial No. 43,464

7 Claims. (Cl. 217—124)

This invention is disclosed as a basket cushion, and cushioned basket cover, to be applied to baskets filled with produce such as peaches, apples, or other fruit or vegetables. On August 27, 1934, I filed an application for a patent on Cushioned basket covers, Serial Number 741,680, and this is a continuation in part of said application.

In packing fruit and the like in a basket, it is customary to fill the basket heaping full and then force the cover down to compress the column of fruit in the basket. Thus, the fruit is held tightly in the basket during handling and shipment, thereby avoiding bruising which would otherwise take place while the fruit is in transit. However, difficulty is encountered in preventing injury to the fruit during the compression or "baling" effected by the application of the basket cover. Heretofore cushions have been placed between the cover and the fruit for the purpose of protecting the fruit, but the cushions of the prior art have not protected the fruit as fully as is desirable. As the top layer of fruit is forced into the mouth of the basket, the fruit in this layer tends to shift outwardly with the result that part of the fruit is often bruised or scored by contact with the rim of the basket. Also, as the rim of the cover approaches the rim of the basket, the cover rim often engages fruit and causes "rim cuts". And during shipment of the packed baskets, the cushions now in general use prevent the upward circulation of air through the basket, which is necessary to carry off moisture and retard spoilage of the fruit.

An object of the present invention is to provide a combination cushion and edge guard which will both cushion the basket cover and minimize damage to the fruit (or the like) caused by contact of the fruit with the rim of the basket and the rim of the cover.

Another object is to provide a basket cushion which is advantageous from a cushioning standpoint and also provides for adequate ventilation of the pack of fruit.

A further object is to provide a cushion having the desired features and characteristics and which can be satisfactorily manufactured at low cost and high speed.

Other objects of the invention will be obvious from the disclosure herewith.

Fig. I is a fragmentary vertical section showing a packed basket with a cushion of the present invention incorporated therein.

Fig. II is a top plan view of the entire cushion, a fragment of which is shown in Fig. I.

Fig. III is a bottom plan view of the cushion shown in Fig. II.

Fig. IV is a vertical section of a basket cover cushioned with the cushion of Fig. II. The section through the cushion is on the line IV—IV of Fig. II; and on the left side of the view, there is shown the rim of a filled basket to illustrate the edge guard action of my cushion during application of the basket cover.

Fig. V is a top plan view of a modified form of cushion embodying the present invention.

Fig. VI is a vertical section of a basket cover cushioned with the cushion of Fig. V. The section through the cushion is on the line VI—VI of Fig. V.

Reference will first be had to Figs. I to IV, inclusive. A conventional basket 1 has a mouth 2, and is adapted to be closed by a cover having a slat top 4 from which a rim 5 depends. Cooperating with the cover is a combination cushion and edge guard comprising a sheet 6, an envelope 7 and a mass 8 of cushioning material. The sheet 6 is a disc of relatively heavy tough paper material, such as light cardboard or heavy paper; and the disc is sufficiently large to permit the edge portion of it to project across the rim 5. If desired, the very edge of disc 6 may be serrated, pectinated, or otherwise cut for decorative effect. The envelope 7 is preferably of relatively light paper and has an annular inturned edge portion 7ª which is secured (e. g. by suitable adhesive) to sheet 6. The mass 8 of cushioning material is preferably quite compressible and is preferably of such character that air can readily circulate through it. As a suitable material for mass 8, I prefer excelsior. A very fine grade of excelsior known as "wood wool" makes an excellent filler for the cushion, but it is more expensive than excelsior of ordinary coarseness and its use increases the cost of the cushion somewhat.

The diameter of the cushioning body (i. e. envelope 7 with its filler) is such that it telescopes within the rim 5, which it may or may not fit snugly, as will be more fully explained later. In use the cushion is ordinarily applied to the basket cover, the envelope 7 being telescoped within the rim 5, and the edge zone 6ª of sheet 6 extending across rim 5. Initially the column of fruit F projects above the top of the basket. In Fig. IV the indicated position of the fruit corresponds to slight compression of the column; and the position indicated in Fig. I corresponds to full compression of the column. As pressure is applied to the cover, the cushioning material compresses as indicated in Fig. IV with the result that the edge zone 6ª of heavy tough paper is flexed downwardly. Thus as the compression of the column of fruit is continued, the edge portion 6ª restrains the top layer of fruit against outward movement and prevents it from being bruised or scored by basket rim 2. Also the projecting heavy sheet protects the fruit from rim 5 as the compression of the column of fruit continues.

Preferably the cushion is so perforated as to permit upward circulation of air through the basket, though for some uses this is not so essential that the ventilating feature may not be omitted. The heavy sheet 6 may be provided with an annularly disposed series of perforations 9; and the envelope 7 may be provided with two series of annularly disposed perforations 10 and 11. Warm air rising through the column of fruit enters the interior of the cushion through perforations 9 and passes out through perforations 10 and 11. Some of perforations 9 may be closed by contact with the fruit, and some of perforations 11 may be closed by contact with the slats of top 4, but enough perforations are provided in each series to ensure that enough of them will be open for adequate ventilation of the basket. Additionally the envelope 7 may be made somewhat smaller than rim 5, as shown in Figs. I and IV, and a series of ventilating perforations 12 may be provided in sheet 6 just outside of the envelope of cushioning material. When perforations 12 are not used, the cushioning envelope is preferably made sufficiently large to be a snug fit in rim 5.

In the modification shown in Figs. V and VI, the general construction of the cushion is the same as in Figs. I to IV. This modification has a heavy sheet 15, a light paper envelope 16, and a filler consisting of a mass of cushioning material 17. However the cushion envelope 16 is shaped to provide opposite peripherial zones 16ª, 16ª which frictionally engage the basket rim 5, while the intermediate peripherial zones 16ᵇ, 16ᵇ are spaced from rim 5. Thus when the cushion is applied to a basket cover, the zones 16ª, 16ª serve to definitely locate the cushion and frictionally hold it in place while the cushioned cover is being applied to the basket. Since the zones 16ª are only sectors of the filled envelope 7, these sectors readily yield inwardly, if necessary, while the cushion is being placed in a basket cover. This provides a range of adjustment to take care of manufacturing variations in the size of envelope 16 and in the size of rim 5. A series of perforations 18 permit ascending air to enter the interior of the cushion; and series of perforations 19 and 20 permit the air to leave the cushion. Adjacent to cushion sectors 16ᵇ, 16ᵇ, the heavy sheet 15 may also be provided with a series of ventilating perforations 21.

In compliance with the patent statutes, I have disclosed the best forms in which I have contemplated applying my invention, but the disclosure is to be considered as illustrative and not as limiting.

What is claimed is:

1. A cushioned cover for a produce basket comprising: a cover structure having a depending annular rim; a flat sheet of heavy paper material having a periphery larger than the rim, the sheet being positioned adjacent to the rim and projecting beyond it; an envelope of relatively light paper secured to the heavy sheet and telescoped within said rim; and a mass of cushioning material within the envelope, the mass being sufficiently porous along non-parallel axes to permit easy circulation of air through it in miscellaneous directions; there being ventilating holes in the heavy sheet, leading to the cushioning mass, and ventilating holes in the envelope, leading from the cushioning mass.

2. A cushioned cover for a produce basket comprising: a cover structure having a depending annular rim; a flat sheet of heavy paper material having a periphery larger than the rim, the sheet being positioned adjacent to the rim and projecting beyond it; an envelope of relatively light paper secured to the heavy sheet and telescoped within said rim; and a mass of cushioning material within the envelope, the mass being sufficiently porous to permit easy circulation of air through it in miscellaneous directions; there being ventilating holes in the heavy sheet, leading to the cushioning mass, and ventilating holes in the envelope, leading from the cushioning mass, and there also being ventilating holes through the heavy sheet just outside of the envelope.

3. For application within the depending rim of the cover of a produce container, a combination cushion and edge guard comprising: a flat sheet of heavy paper material, said sheet having a periphery larger than the rim of the cover and being adapted to project across the rim; and a cushioning body attached to the heavy sheet and adapted to telescope within the rim, the cushioning body having oppositely located peripherial zones positioned to frictionally engage the inside of the rim and having intermediate peripherial zones positioned inwardly to be spaced from the rim.

4. For application within the depending rim of the cover of a produce container, a combination cushion and edge guard comprising: a flat sheet of heavy paper material, said sheet having a periphery larger than the rim of the cover and being adapted to project across the rim; and a cushioning body attached to the heavy sheet and adapted to telescope within the rim, the cushioning body having oppositely located peripherial zones positioned to frictionally engage the inside of the rim and having intermediate peripherial zones positioned inwardly to be spaced from the rim, there being ventilating holes through the heavy sheet adjacent to and outside of the inwardly positioned peripherial zones of the cushioning body.

5. For application within the depending rim of the cover of a produce container, a combination cushion and edge guard comprising: a substantially planar sheet of heavy flexible paper material, said sheet having a periphery larger than the rim of the cover and being adapted to project across the rim; and a centrally located cushioning body attached to a surface of the heavy sheet and adapted to telescope within the rim of the cover, the cushioning body being smaller than said sheet and being compressible whereby it yields during its application to a filled container and flexes downwardly the zone of the heavy sheet which is adjacent to the rim of the cover.

6. For application within the depending rim of the cover of a produce container, a combination cushion and edge guard comprising: a sheet of heavy flexible paper material, said sheet having a periphery larger than the rim of the cover and being adapted to project across the rim; and a cushioning body attached to a surface of the heavy sheet and adapted to telescope within the rim of the cover, the cushioning body being compressible whereby it yields during its application to a filled container and flexes downwardly the zone of the heavy sheet which is adjacent to the rim of the cover; said heavy sheet being provided with ventilating holes positioned outside of and adjacent to the periphery of said cushioning body.

7. For application within the depending rim of the cover of a produce container, a combination cushion and edge guard comprising: a sheet of heavy flexible paper material, said sheet having a periphery larger than the rim of the cover and being adapted to project across the rim; and a cushioning body attached to the heavy sheet and adapted to telescope within the rim of the cover, the cushioning body being compressible whereby it yields during its application to a filled container and flexes downwardly the zone of the heavy sheet which is adjacent to the rim of the cover, the cushioning body including a mass of cushioning material sufficiently porous along non-parallel axes to permit air circulation through it in miscellaneous directions, and there being ventilating holes leading to and from the mass of cushioning material.

JOHN H. WOODALL.